United States Patent Office 3,003,950
Patented Oct. 10, 1961

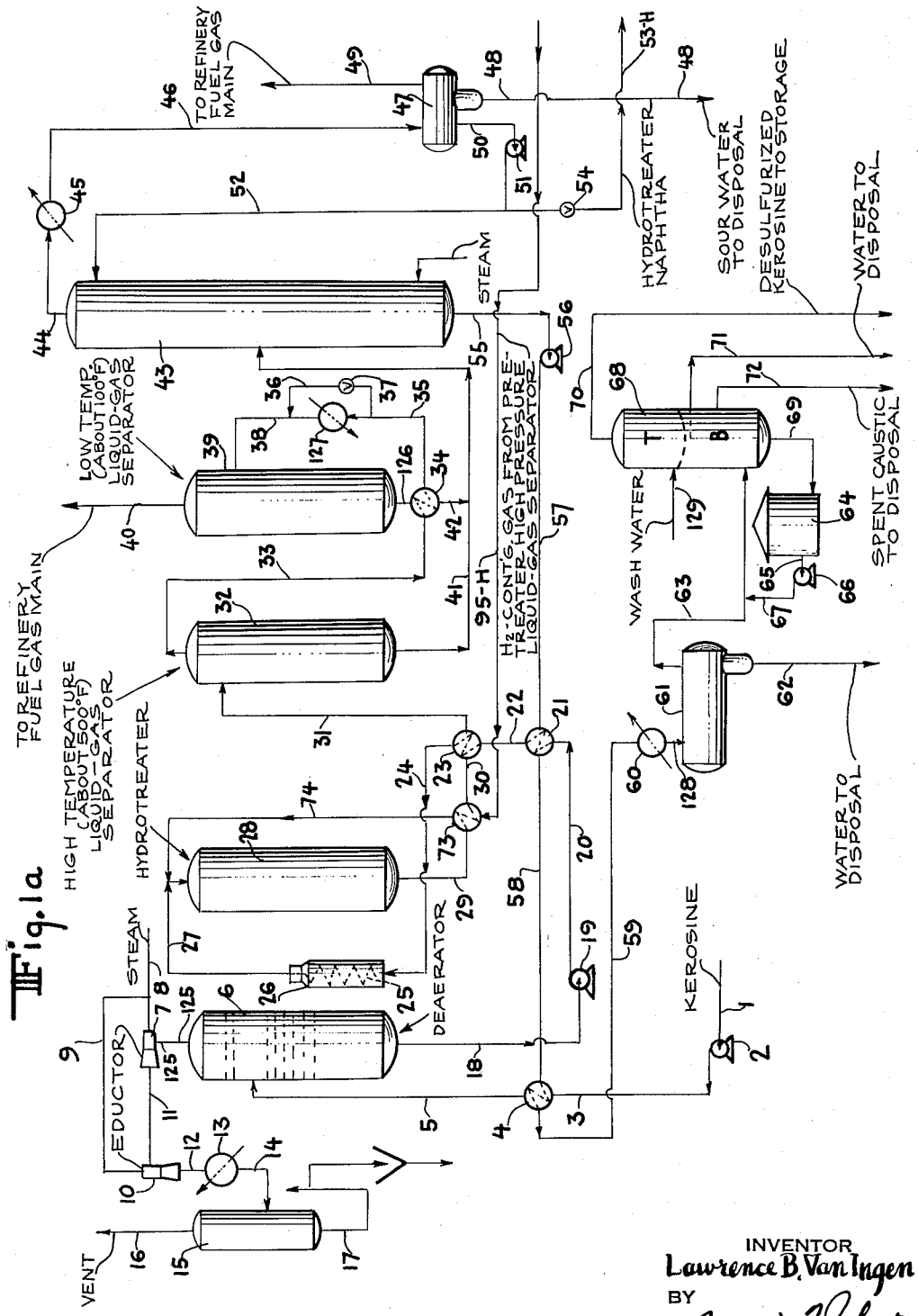

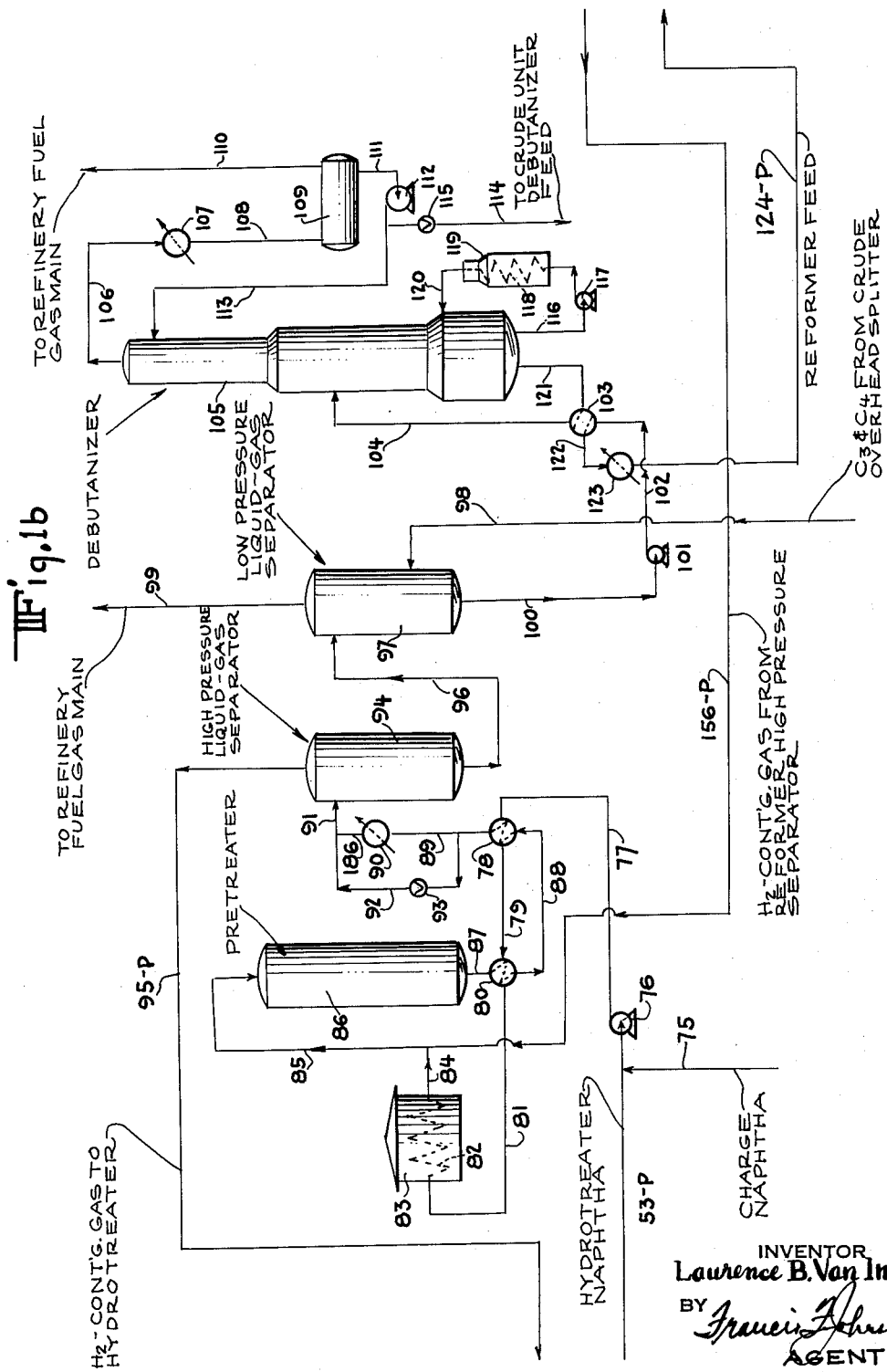

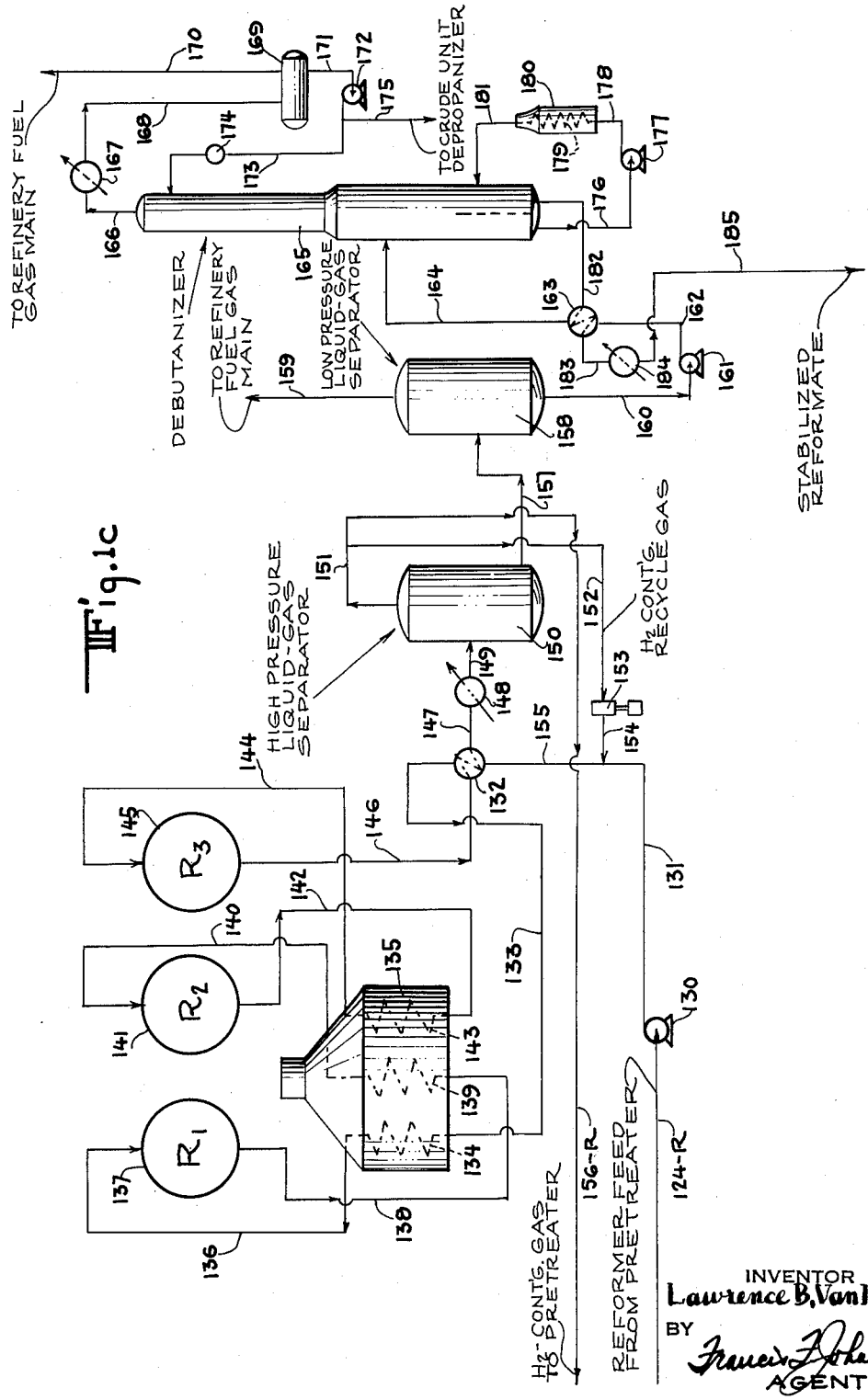

3,003,950
PRODUCING STABILIZED KEROSENE AND THE LIKE WITH REDUCED HYDROGEN CIRCULATION
Lawrence B. Van Ingen, Glenhead, N.Y., assignor to Socony Mobil Oil Company, Inc., a corporation of New York
Filed Oct. 9, 1958, Ser. No. 766,262
3 Claims. (Cl. 208—89)

The present invention relates to the hydrogenation of hydrocarbon mixtures boiling between the 90 percent point of light gasoline and the 10 percent point of light gas oil and, more particularly, to the hydrogenation of the aforesaid hydrocarbon mixtures with reduced hydrogen circulation and improved utilization of hydrogen produced in reforming.

It is conventional to hydrotreat, i.e., treat with hydrogen, kerosene, heavy naphtha, and light gas oils in the presence of hydrogenating catalysts having hydrodesulfurizing capabilities at temperatures within the range of about 675° to about 750° F., at pressures within the range of about 500 to about 1000 p.s.i.g., at space velocities (volume of oil/hour/volume of catalyst, v./hr./v.) of about 3 to about 6 with hydrogen circulation rates of about 500 to about 1500 standard cubic feet (s.c.f.) per barrel of oil treated.

Typical of the hydrogenating catalyst having hydrodesulfurizing capabilities and conditions for treatment of kerosene and the like in the presence of the aforesaid hydrogenating catalyst to produce a treated kerosene containing only about 1 to 2 percent of the mercaptan-sulfur (RSH—S) and about 1 to 2 percent of the total sulfur originally present in the untreated kerosene are the following:

TABLE I
Catalyst:
  Mixture of oxides of cobalt and molybdenum on a carrier such as alumina and comprising about 2.5 to about 4 percent by weight cobalt and about 7 to 11 percent by weight molybdenum
Feed (kerosene):
  Boiling range, °F _____ 340 to 513
  RSH—S, wt. percent _____ 0.004 to 0.0065
  Total sulfur, wt. percent _____ 0.33 to 0.36
  Hydrogen circulation rate, s.c.f./b__ 900 to 1000

Under the aforesaid conditions about 98 to about 99 percent of the mercaptan-sulfur and about 98 to 99 percent of the total sulfur is removed to provide a treated product containing about 1 to about 2 percent of the mercaptan-sulfur and about 1 to about 2 percent of total sulfur originally present in the untreated kerosene.

It likewise has been conventional for a number of years to desulfurize naphtha prior to subjecting the hydrodesulfurized naphthas to conversions such as reforming. [British Patent No. 315,439 (1929), and British Patent No. 424,531 (1935).] More recently it has been conventional to hydrodesulfurize naphtha prior to reforming in the presence of excess reformer recycle gas and in the presence of a hydrogenating catalyst comprising a mixture of oxides of cobalt and molybdenum.

It has now been discovered that kerosene and the like can be hydrodesulfurized in the presence of hydrogenating catalyst having hydrodesulfurizing capabilities employing hydrogen-containing gas containing hydrogen sulfide produced in hydrodesulfurizing naphtha whilst circulating only about 25 to about 40 percent as much hydrogen as has been standard practice heretofore. Thus, hydrocarbon mixtures having boiling ranges within the range of temperature above the 90 percent point of light naphtha and below the 10 percent point of heavy gas oil, i.e., boiling within the range of about 320° to about 450° F. can be desulfurized in the presence of a hydrogenating catalyst having hydrodesulfurizing capabilities under the conditions set forth in Table II with a reduced hydrogen circulation rate to produce a product meeting specifications as to mercaptan sulfur and total sulfur although the treated product nevertheless retains not more than about 3 percent of the mercaptan sulfur and not more than about 14 percent of the total sulfur present in the untreated kerosene, preferably about 0.5 to about 1 percent mercaptan sulfur and 2 to 3 percent total sulfur.

TABLE II
Catalyst: Wt. percent
  Cobalt oxide _____ 4
  Molybdenum oxide on alumina _____ 10
Reaction temperature, °F _____ About 675 to 725
Reaction pressure, p.s.i.g _____ About 390 to 430
Liquid space velocity, v./hr./v _____ About 4 to 6
Hydrogen circulation, s.c.f./b _____ About 200 to 400
H₂S, grains/s.c.f _____ About 1 to 2

Furthermore, it has been found that excess reformer gas can be used successively to hydrodesulfurize naphtha feed to a reformer and to hydrotreat kerosene and the like without compressing the excess reformer gas either between the reformer and the naphtha hydrodesulfurization or between the naphtha hydrodesulfurization and the hydrotreatment of the kerosene. In other words, hydrodesulfurized naphtha is reformed at reforming pressure in excess of 500 p.s.i.g. at reforming conditions of temperature and pressure to produce hydrogen-containing gas in excess of that required in the aforesaid reforming. This excess hydrogen-containing gas at reforming pressure less only pressure drop due to intervening piping, etc., is used to hydrodesulfurize the naphtha to be reformed. The aforesaid excess reformer gas less that reacted with the naphtha and at the pressure employed in hydrodesulfurizing said naphtha less pressure drop due to intervening piping, etc. is then used to hydrotreat kerosene.

Illustrative of the foregoing is the combined operation of reforming hydrodesulfurized naphtha, hydrodesulfurizing naphtha, and hydrotreating kerosense depicted by the flow sheets FIGURES 1a, 1b and 1c.

The flow sheet presented in FIGURE 1a illustrates the flow of gases and liquids for the hydrotreating of a hydrocarbon mixture having a boiling range within the range of temperature from the 90 percent point of light naphtha to the 10 percent point of heavy gas oil, for example, kerosene having a boiling range IBP, °F _____ 320 to 340
10% point, °F _____ 335 to 355
50% point, °F _____ 360 to 380
90% point, °F _____ 410 to 430
EBP, °F _____ 445 to 460 employing hydrogen-containing gas flowing from the high-pressure liquid-gas separator of the naphtha pretreating unit (see flow sheet FIGURE 1b).

The flow sheet set forth as FIGURE 1b illustrates the flow of liquids and gases for the hydrodesulfurization of naphtha to be reformed employing hydrogen-containing gas from the high-pressure liquid-gas separator of the naphtha reforming unit (see Flow Sheet 1c).

FIGURE 1c is a flow sheet illustrating the flow of liquids and gases in the reforming of the naphtha hydrodesulfurized in the pretreating unit (FIGURE 1b) in the presence of a particle-form solid reforming catalyst, for example, a platinum-type catalyst, specifically a platinum-type catalyst comprising about 0.35 percent by weight platinum, about 0.71 percent by weight chlorine on a carrier comprising alumina.

The reaction conditions for each treatment are within the ranges set forth in Table III.

TABLE III

HYDROTREATING
Catalyst:
  4 wt. percent CoO
  10 wt. % MoO$_3$
  Carrier: Al$_2$O$_3$

|  | Broad | Preferred |
|---|---|---|
| Temperature, °F | 675 to 750 | 675 |
| Pressure, p.s.i.g | 390 to 430 | 420 |
| Space Velocity, v./hr./v | 4 to 6 | 5 |
| Hydrogen Circulation, s.c.f./b | 200 to 400 | 320 |

HYDRODESULFURIZING
Catalyst:
  4 wt. Percent CoO
  10 wt. Percent MoO$_3$
  Carrier: Al$_2$O$_3$

|  | Broad | Preferred |
|---|---|---|
| Temperature, °F | 675 to 725 | 700 |
| Pressure, p.s.i.g | 460 to 490 | 470 |
| Space Velocity, v./hr./v | 4 to 6 | 5 |
| Hydrogen Circulation, s.c.f./b | 150 to 300 | 200 |

REFORMING
Catalyst:
  0.35 wt. Percent Pt
  0.71 wt. percent Cl
  Carrier: Al$_2$O$_3$

|  | Broad | Preferred |
|---|---|---|
| Temperature, °F.[1] | 850 to 980 | 930 |
| Pressure, p.s.i.g | 450 to 600 | 550 |
| Space Velocity, v./hr./v | 0.5 to 2.5 | 2 |
| Hydrogen to Naphtha Mol Ratio | 5 to 12 | 6 |

[1] Temperature is dependent upon activity of catalyst, space velocity, and required octane rating of product.

While the hydrogen-containing gas employed for hydrodesulfurizing the naphtha to be reformed and for hydrotreating the kerosene is obtained solely from the reforming unit, it appears more desirable to describe the integrated operation illustrated in FIGURES 1a, b and c starting with the hydrotreating of the kerosene or similar fraction having a boiling range within the range bounded by the 90 percent point of light naphtha and the 10 percent point of heavy gas oil. Accordingly, reference is first made to FIGURE 1a.

Hydrotreating

In FIGURE 1a is illustrated the flow of liquids and gases in the hydrotreatment of kerosene, for example, at temperatures not greater than about 675° to about 700° F. at lower than usual pressure and lower than prior art hydrogen circulation rates employing hydrogen-containing gases originating as excess recycle gas in the reforming unit and supplied from the high-pressure separator of the pretreating unit. It is to be observed that the reforming unit is operated under reforming conditions to produce an amount of make-gas, i.e., gas in excess of that required for reforming sufficient to maintain circulation of about 200 to 400, preferably about 300 to 390, standard cubic feet of hydrogen per barrel of hydrocarbons charged to the hydrotreating unit. Since none of the hydrogen-containing gas is recycled through the hydrotreating unit and since none of the hydrogen-containing gas is recycled through the pretreating unit, the reforming unit is operated under conditions to produce about 300 to about 500, preferably about 400 to about 450, standard cubic feet per barrel of naphtha reformed.

In accordance with the flow illustrated in FIGURE 1a kerosene, for example, is drawn from a source not shown through pipe 1 by pump 2. Pump 2 discharges the kerosene into pipe 3 at a pressure higher than the pressure in deaerator 6. The kerosene flows through pipe 3 to heat exchanger 4 where the kerosene is in indirect heat exchange relation with the bottoms of stripper 43 pumped to heat exchanger 4 through pipe 57, heat exchanger 21 and pipe 58 by pump 56.

From heat exchanger 4 the kerosene flows through pipe 5 to deaerator 6. Deaerator 6 is kept under a pressure of about 60 millimeters of mercury (26–27 inches of water) by means of steam eductors 7 and 10 or other suitable means.

Steam eductors 7 and 10 are in tandem. Deaerator 6 is held at a temperature of about 140° F. Steam at about 150 to 300 p.s.i.g. flows from a source not shown through pipe 8. A portion is diverted to eductor 10 through pipe 9; the balance flows to eductor 7. The passage of the steam through eductor 7 draws air from deaerator 6 through conduit 125. The discharge of eductor 7 comprising steam and air flows through conduit 11 to eductor 10. The discharge of eductor 7 together with the steam flowing into eductor 10 through pipe 9 flows from eductor 10 through conduit 12 to condenser 13. The condensed steam and uncondensed air flow from condenser 13 through conduit 14 to condensate pot 15. Air escapes from pot 15 through vent 16. Water flows from pot 15 through barometric leg 17 to disposal.

The deaerated kerosene containing not more than 20 p.p.m. of oxygen flows from deaerator 6 through pipe 18 to the suction side of pump 19. Pump 19 discharges the deaerated kerosene into pipe 20 at a pressure greater than that of hydrotreater 28. The deaerated kerosene flows through pipe 20 to heat exchanger 21 where the deaerated kerosene is in indirect heat exchange relation with the bottoms of stripper 43 pumped to heat exchanger 21 through pipe 57. From heat exchanger 21 the deaerated kerosene flows through pipe 22 to heat exchanger 23 where the deaerated kerosene is in indirect heat exchange relation with the hydrotreater effluent flowing from heat exchanger 73 through conduit 30. From heat exchanger 23 the deaerated kerosene flows through pipe 24 to coil 25 in heater 26.

In heater 26 the deaerated kerosene is heated to a reaction temperature within the range of about 675 to about 775, preferably about 675 to about 700. The heated kerosene flows from heater 26 through conduit 27 to hydrotreater 28. At some point in conduit 27 intermediate heater 26 and hydrotreater 28 hydrogen-containing gas flowing from high-pressure liquid-gas separator 94 (FIG. 1b) of the pretreating unit through conduits 95–P, 95–H and 74 is mixed with the heated kerosene at a rate to provide about 200 to about 400, preferably about 310 to about 330 standard cubic feet of hydrogen per barrel of heater kerosene to form a hydrotreater charge. This amount of hydrogen is less than usually employed in the hydrotreating of kerosene.

The hydrotreater charge flows downwardly through hydrotreater 28 in contact with the hydrogenating catalyst having hydrodesulfurizing capabilities at a pressure below that usually employed for hydrodesulfurizing and about 390 to about 430, preferably about 410 to about 425 p.s.i.g. Under the hydrotreating conditions set forth hereinbefore there is substantially no conversion of naphthenes to aromatics and in fact there is substantial hydrogenation of the aromatics originally present in the kerosene.

The hydrotreater effluent flows from hydrotreater 28 through conduit 29 to heat exchanger 73 where the hydrotreater effluent is in indirect heat exchange relation with the hydrogen-containing gas flowing from the pretreater high-pressure liquid-gas separator through conduit 95–H as previously described. From heat exchanger 73 the hydrotreater effluent flows through conduit 30 to heat exchanger 23 where the hydrotreater effluent is in indirect heat exchange relation with the deaerated kerosene as previously described herein. From heat exchanger 23 the hydrotreater effluent flows through conduit 31 to hydrotreater high-temperature liquid-gas separator 32.

In high-temperature liquid-gas separator 32 those constituents of the hydrotreater effluent volatile at about 400 p.s.i.g. and about 500 to 550° F. are separated from the heavier constituents, i.e., $C_{12}$ and heavier hydrocarbons. The volatile constituents, i.e., high temperature vapors, flow from separator 32 through conduit 33 to heat exchanger 34 where the high temperature vapors, i.e., $C_{10}$ and lighter, of the hydrotreater effluent are in indirect heat exchange relation with the condensate ($C_4$ and heavier hydrocarbons) flowing from low temperature liquid-gas separator 39 through pipe 126. From heat exchanger 34 the high temperature vapors flows through conduit 35 to condenser 127. The flow of high temperature vapors is proportioned between conduit 35 to condenser 127 and conduit 36 under control of valve 37 by-passing condenser 127 to reduce the temperature of the high temperature vapors to about 90° to about 110° F., preferably about 100° F. From condenser 127 and by-pass 36 the cooled high-temperature vapors flow through conduit 38 to low-temperature liquid-gas separator 39.

In liquid-gas separator 39 those constituents volatile at about 390 p.s.i.g. and 100° F. are separated from the condensed heavier hydrocarbons. The $C_3$ and lighter hydrocarbons together with hydrogen sulfide and hydrogen and other constituents of the high temperature vapors volatile at about 100° F. and about 350 to about 400 p.s.i.g. flow from low temperature separator 39 through conduit 40 to the refinery fuel gas main or to means for recovering valuable constituents such as sulfur.

The condensed portion, i.e., the heavier hydrocarbons, of the high temperature vapors flow from separator 39 through pipe 126 to heat exchanger 34 where the low temperature condensate is in indirect heat exchange relation with the high temperature vapors as previously described hereinbefore. From heat exchanger 34 the low temperature condensate flows through pipe 42 to pipe 41 where the low temperature condensate is mixed with the high temperature condensate flowing from high temperature separator 32 through pipe 41. The mixture of high temperature condensate and low temperature condensate is the feed to the kerosene stripper 43. The stripper feed flows through pipe 41 to kerosene stripper 43.

Kerosene stripper 43 is maintained at a temperature at which $C_{12}$ and lighter hydrocarbons at a pressure of about 60 to 70 p.s.i.g. are volatile. Usually the temperature in stripper 43 will be about 375 to about 390° F. at the bottom. The kerosene stripper overhead comprising $C_{12}$ and lighter hydrocarbons flows therefrom through pipe 41 to cooler 45 where the temperature of the stripper overhead is reduced to that at which $C_4$ and heavier hydrocarbons condense. Usually the temperature of the stripper overhead is reduced to about 90° to about 110° F. The cooled stripper overhead flows from cooler 45 through pipe 46 to accumulator 47.

In accumulator 47 water is separated from condensed hydrocarbons. The separated water flows from accumulator 47 through pipe 48 to disposal. The condensed hydrocarbons, i.e., $C_4$ to $C_{12}$ hydrocarbons flow from accumulator 47 through pipe 50 to the suction side of pump 51. Pump 51 discharges the condensed hydrocarbons into pipe 52. A portion of the pump discharge flows through pipe 52 to kerosene stripper 43 for use as reflux. The balance of the condensed hydrocarbons, $C_4$ to $C_{12}$ hydrocarbons boiling in the gasoline boiling range, flow from pipe 52 through pipe 53–H under control of valve 54 to pipe 53–P (FIGURE 1b) to be admixed with straight run gasoline to be hydrodesulfurized and reformed. The uncondensed hydrocarbons, i.e., $C_3$ and lighter hydrocarbons, and traces of hydrogen sulfide and gasoline components flow from accumulator 47 through conduit 49 to the refinery fuel gas system or other means of disposal.

The bottoms of kerosene stripper 43, comprising hydrodesulfurized hydrocarbons boiling above about 410° F. and containing about 9 to about 14, preferably about 10 to 11, percent of the total sulfur originally present in the feed to the hydrotreater, flows therefrom through pipe 55 to the suction side of pump 56. Pump 56 discharges the stripper bottoms into pipe 57 through which the stripper bottoms flows to heat exchanger 21. In heat exchanger 21 the stripper bottoms is in indirect heat exchange relation with the deaerated kerosene as described hereinbefore. From heat exchanger 21 the stripper bottoms flows through pipe 58 to heat exchanger 4 where the stripper bottoms is in indirect heat exchange relation with the raw kerosene as previously described. From heat exchanger 4 the stripper bottoms flows through pipe 59 to cooler 60. From cooler 60 the stripper bottoms flows through pipe 128 to accumulator 61. In accumulator 61 water separates and flows therefrom through pipe 62 to disposal means. The hydrocarbons flow from accumulator 61 through pipe 63 to caustic separator and water washer 68. At a point in pipe 63 intermediate accumulator 61 and separator-washer 68 aqueous alkali metal hydroxide solution containing about 15 to about 25 percent alkali metal hydroxide equivalent to about 10 to 15 percent by volume of the stripper bottoms hydrocarbons is introduced into pipe 63 from pipe 67 and is mixed with the stripper bottoms hydrocarbons. The mixture of hydrocarbons and aqueous alkali metal hydroxide solution flows through pipe 63 to separator-washer 68. In separator-washer 68 the aqueous caustic solution separates from the stripper bottoms hydrocarbons in section B. The heavier aqueous caustic solution flows therefrom through pipe 69 to caustic storage 64 and thence through pipe 65 to pump 66 which discharges the caustic into pipe 67 through which the caustic flows to pipe 63. A drag stream of spent caustic is drawn either intermittently or continuously, as required, through the spent caustic outlet and pipe 72. The spent caustic flows through pipe 72 to caustic disposal means.

The stripper bottoms hydrocarbons flow from the top of section B of separator-washer 68 through pipe 129–A. At a point in pipe 129–A intermediate sections B and T the stripper bottoms hydrocarbons are contacted with wash water flowing through pipe 129. The mixture of water and hydrocarbons flows through pipe 129–B to section T. The water is separated in section T and flows through pipe 71 to disposal means. The washed stripper bottoms now designated desulfurized kerosene containing not more than about 3, preferably about 0.5 to about 1 percent of the mercaptans originally present in the raw kerosene and not more than about 14, preferably about 2 to about 3 percent of the total sulfur originally present in the raw kerosene, and containing about 0.0001 to about 0.0003 percent by weight mercaptan sulfur and about 0.0010 to about 0.0020 percent by weight total sulfur flows from separator-washer 68 through pipe 70 to storage, the addition of additives, distribution and the like.

It will be noted that the mercaptan sulfur and total sulfur removal can run as high as 99 percent and 98 percent respectively.

*Pretreating*

As was indicated hereinbefore some hydrocarbons boiling in the gasoline boiling range ($C_5$ to 450° F.) are separated from the hydrotreater effluent in the stripper overhead accumulator 47. The hydrotreater naphtha flows from accumulator 47 to pump 51 and is pumped in part under control of valve 54 through pipe 53–H to pipe 53–P and the suction side of pump 76 (FIGURE 1b). Straight run naphtha is drawn from a source not shown by pump 76 through pipe 75 and mixed with the hydrotreater naphtha. Usually the hydrotreater naphtha and the straight run naphtha are mixed in proportions of about 2.5 to 5 volumes of hydrotreater naphtha to 1000 volumes of straight run naphtha or in the proportions to provide a pretreater charge naphtha containing not more than about 7 to 10 p.p.m. (parts per million) of nitrogen. The pretreater charge naphtha is pumped by pump 76 at a pressure greater than that in pretreater 86 through pipe 77 to heat exchanger 78. In heat exchanger 78 the pretreater charge naphtha is in indirect heat exchange relation with the pretreater effluent flowing from pretreater 86 through conduit 87, heat exchanger 80 and conduit 88 to heat exchanger 78. From heat exchanger 78 the pretreater charge naphtha flows through pipe 79 to heat exchanger 80 where the pretreater charge naphtha is in indirect heat exchange relation with the pretreater effluent flowing thereto through conduit 87. From heat exchanger 80 the pretreater charge naphtha flows through pipe 81 to coil 82 in heater 83.

In heater 83 the pretreater charge naphtha is heated to a hydrodesulfurizing and hydrodenitrogenizing, i.e., a hydrodecontaminating temperature within the range of about 675° to about 725° F. The heated pretreater charge naphtha flows from heater 83 through pipe 84 to conduit 85. In conduit 85 the pretreater charge naphtha is mixed with about 200 to about 500 standard cubic feet (s.c.f.) of hydrogen flowing from the high-pressure liquid-gas separator 150 (FIGURE 1c) through conduits 156–R and 156–P to conduit 85. The pretreater charge mixture thus formed flows through conduit 85 to pretreater 86.

The pretreater charge mixture flows downwardly through pretreater 86 in contact with a hydrogenating catalyst having hydrodesulfurizing and hydrodenitrogenizing capabilities. The pretreater catalyst may be the same or a different catalyst as that used in the hydrotreater. It is to be noted that the pressure in pretreater 86 is sufficiently higher than the pressure in hydrotreater 28 that the hydrogen-containing gas separated in pretreater high-pressure separator 94 flows without further compression from separator 94 to hydrotreater 28. For the flow paths indicated a pressure differential between pretreater 86 and hydrotreater 28 of about 40 to 65 p.s.i. is sufficient.

The pretreater effluent flows therefrom through conduit 87 to heat exchanger 80 and through conduit 88 to heat exchanger 78. From heat exchanger 78 the pretreater effluent flows through conduit 89 to cooler 90. A portion of the pretreater effluent is passed around cooler 90 by way of conduit 92 under control of valve 93. The proportions of cooled and by-passed pretreater effluent and the temperature to which the cooled portion of the pretreater effluent is cooled are balanced to provide a high-pressure separator feed having a temperature at which the heavier hydrocarbons are condensed under the existing pressure. The uncondensed and condensed pretreater effluent flow through conduit 91 to pretreater high-pressure liquid-gas separator 94.

In pretreater high-pressure liquid-gas separator 94 the uncondensed pretreater effluent comprising hydrogen, about 100 to about 150 grains of hydrogen sulfide (per 100 standard cubic feet), some gasoline components, and the lighter hydrocarbons separates from the condensed pretreater effluent. The uncondensed pretreater effluent flows from separator 94 through conduit 95–P to conduit 95–H (FIGURE 1a) to heat exchanger 73, conduit 74 and hydrotreater 28 as described hereinbefore.

The condensed pretreater effluent flows from separator 94 through pipe 96 to pretreater low-pressure separator 97. In pretreater low-pressure separator 97 traces of hydrogen sulfide, ammonia and the lighter hydrocarbons separate at the lower pressure. The separated gases and vapors are vented from separator 97 through conduit 99 to the refinery fuel gas main or other disposal means. In general, the pressure in low-pressure separator 97 is at least about 250 p.s.i. and preferably at least about 275 p.s.i. lower than the pressure in separator 94 while the temperature is lowered only as a result of the reduction in pressure, say about 10° F.

It is preferred to introduce into low pressure separator 97 the $C_3$ and $C_4$ hydrocarbons from the crude overhead splitter. These hydrocarbons are introduced from a source not shown into separator 97 through pipe 98.

The pretreater effluent condensate, i.e., some hydrogen, light ends and $C_4$ and heavier hydrocarbons flows from separator 97 through pipe 100 to the suction side of pump 101. Pump 101 discharges the pretreater condensate into pipe 102 through which the pretreater condensate flows to heat exchanger 103 where the pretreater condensate is in indirect heat exchange relation with the bottoms of debutanizer 105 flowing therefrom through pipe 121. From heat exchanger 103 the pretreater condensate flows through pipe 104 to debutanizer 105.

In debutanizer 105 the pretreater condensate is maintained at a temperature at which $C_4$ and lighter hydrocarbons are volatile. The $C_4$ and lighter hydrocarbons are taken overhead through pipe 106 to cooler 107 where the overhead is cooled to a temperature at which $C_4$ hydrocarbons are condensed. The cooled debutanizer overhead flows from cooler 107 through pipe 108 to accumulator 109. The lighter hydrocarbons are vented from accumulator 109 through pipe 110 to the refinery fuel gas main. The condensed $C_4$ hydrocarbons flow from accumulator 109 through pipe 111 to the suction side of pump 112. Pump 112 discharges the $C_4$ hydrocarbons into pipe 113 through which a portion to serve as reflux flows to debutanizer 105. The balance under control of valve 115 flows through pipe 114 to the crude unit debutanizer feed.

A portion of the debutanizer bottoms, i.e., $C_5$ and heavier hydrocarbons, flows through a reboiler comprising pipe 116, pump 117, pipe 125, coil 118 in fired heater 119 and pipe 120. Any other means for maintaining a temperature in debutanizer 105 at which $C_4$ and lighter hydrocarbons are volatile can be substituted for the reboiler illustrated. The net debutanizer bottoms, i.e., reformer feed, flows from debutanizer 105 through pipe 121 to heat exchanger 103. From heat exchanger 103 the reformer feed flows through pipe 122 to cooler 123 where the reformer feed is cooled to a temperature at which the lowest boiling constituent of the reformer feed is not volatile. The cooled reformer feed flows from cooler 123 through pipe 124–P to pipe 124–R (FIGURE 1c) to the suction side of pump 130. The reformer feed contains not more than 20 p.p.m. of sulfur and not more than 1 p.p.m. of nitrogen.

The reformer feed is pumped by pump 130 through pipe 131 at a pressure in excess of that existing in reformer 137 ($R_1$) to conduit 155. Hydrogen-containing recycle gas drawn from reformer high-pressure liquid-gas separator 150 through conduits 151 and 152 by compressor 153 and discharged through conduit 154 into conduit 155 is mixed with the reformer feed in conduit 155 in the proportion of between 6 to 10 mols of hydrogen per mol of reformer feed, preferably about 6 to 1, to form a reformer charge mixture.

The reformer charge mixture flows through conduit 155 to heat exchanger 132 where the reformer charge mixture is in indirect heat exchange relation with the effluent from reformer 145, hereinafter designated final effluent. From heat exchanger 132 the reformer charge mixture flows through conduit 133 to coil 134 in heater 135.

In heater 135 the reformer charge mixture is heated to a reforming reaction temperature within the range of about 800° to about 980° F. dependent upon the activity of the reforming catalyst, the space velocity and the required octane rating of the reformate. From coil 134 the heated reformer charge mixture flows through conduit 136 to reformer 137. In reformer 137 the reformer charge mixture is in contact with particle-form solid reforming catalyst, preferably of the platinum type. The first reformer effluent flows from reformer 137 through conduit 138 to coil 139 in heater 135. In coil 139 the first effluent is reheated to a reforming temperature higher, the same as, or lower than the temperature at which the reformer charge mixture was heated in coil 134. The reheated first reactor effluent flows from coil 139 through conduit 140 to reformer 141 where it is in contact with particle-form reforming catalyst preferably the same as the reforming catalyst in reformer 137. From reformer 141 the second effluent flows through conduit 142 to coil 143 in heater 135. In coil 143 the second effluent is reheated to a reforming temperature the same as, or higher or lower than the temperature at which the reformer charge mixture and the first effluent were heated in coils 134 and 139 respectively. From coil 143 the reheated second effluent flows through conduit 144 to reformer 145. In reformer 145 the reheated second effluent is in contact with reforming catalyst preferably of the same type as the catalyst in reformers 137 and 141. The final effluent flows from reformer 145 through conduit 146 to heat exchanger 132. In heat exchanger 132 the final effluent is in indirect heat exchange relation with the reformer charge mixture flowing through conduit 155. From heat exchanger 132 the final effluent flows through conduit 147 to cooler 148 where the temperature of the final effluent is lowered to a temperature at which the heavier hydrocarbons are condensed under the existing pressure. The condensed and uncondensed final effluent flows from heat exchanger 148 through conduit 149 to reformer high pressure liquid gas separator 150.

In reformer high pressure liquid gas separator 150 the uncondensed final effluent separates from the condensed final effluent. The uncondensed final effluent flows from separator 150 through conduit 151. A portion of the uncondensed final effluent, sufficient to provide about 6 to about 10, preferably about 6, mols of hydrogen per mol of reformer feed, flows through conduit 152 to the suction side of compressor 153 as described hereinbefore. The balance of the uncondensed final effluent flows through conduit 156–R to conduit 156–P and thence to pretreater 86 (FIGURE 1a) as described hereinbefore.

The condensed final effluent, comprising hydrogen, light ends, and $C_4$ and heavier hydrocarbons, flows from reformer high pressure liquid gas separator 150 through pipe 157 to reformer low pressure liquid gas separator 158. In low pressure liquid gas separator 158 hydrogen and the lighter hydrocarbons are vented through conduit 159 to the refinery fuel gas main. The hydrocarbons liquid at the pressure and temperature existing in low pressure liquid gas separator 158 flow therefrom through pipe 160 to the suction side of pump 161.

Usually the temperature in both the reformer high pressure liquid gas separator 150 and in the reformer low pressure liquid gas separator 158 are about the same and usually within the range of about 90° to about 110° F. However, while the pressure in the reformer high pressure liquid gas separator 150 is substantially that of reactor 145 the pressure in the reformer low pressure liquid gas separator is usually within the range of about 175 to about 200 p.s.i.g.

The low pressure separator condensate, hereinafter designated raw reformate as stated hereinbefore, flows from separator 158 through pipe 160 to pump 161. Pump 161 discharges the raw reformate into pipe 162 through which the raw reformate flows to heat exchanger 163. In heat exchanger 163 the raw reformate is in indirect heat exchange relation with the bottoms of the reformer debutanizer flowing therefrom through pipe 182. The raw reformate flows from heat exchanger 163 through pipe 164 to reformer debutanizer 165. In reformer debutanizer 165 a temperature is maintained at which $C_4$ and lighter hydrocarbons are volatile. A reboiler comprising pipe 176, pump 177, pipe 178, coil 179 in fired heater 180 and pipe 181 can be employed to heat a portion of the bottoms of the reformer debutanizer to maintain the aforesaid temperature.

In reformer debutanizer 165 the $C_4$ and lighter hydrocarbons are taken overhead through conduit 166 to cooler 167. In cooler 167 the $C_4$ and heavier hydrocarbons are condensed. The condensed and uncondensed debutanizer overhead flow from cooler 167 through conduit 168 to debutanizer overhead accumulator 169. The uncondensed debutanizer overhead is vented from accumulator 169 through conduit 170 to the refinery fuel gas main. The condensed debutanizer overhead flows from accumulator 169 through pipe 171 to the suction side of pump 172. Pump 172 discharges the condensed debutanizer overhead into pipe 173 through which under control of valve 174 a portion of the condensed debutanizer overhead flows to reformer debutanizer 165 for use as reflux. The balance of the condensed debutanizer overhead flows from pipe 173 through pipe 175 to the crude unit depropanizer.

The net reformer debutanizer bottoms flows through pipe 182 to heat exchanger 163. In heat exchanger 163, as stated hereinbefore, the reformer debutanizer bottoms, hereinafter designated stabilized reformate, is in indirect heat exchange relation with the bottoms of low pressure liquid gas separator 158 as described hereinbefore. From heat exchanger 163 the stabilized reformate flows through pipe 183 to cooler 184. In cooler 184 the stabilized reformate is cooled to a temperature at which the lowest boiling constituent thereof is not volatile. From cooler 184 the stabilized reformate flows through pipe 185 to storage, the addition of additives, distribution and the like.

It will be observed that hydrogen-containing gases are cascaded from the reformer high pressure liquid gas separator to the pretreater and from the pretreater high pressure liquid gas separator to the hydrotreater. "Cascaded" as used herein describes the flow of hydrogen-containing gases from a point in one unit at an elevated pressure to a plurality of points in two other units without recompression. It will be noted that the pressure differential between the reforming reactor and the pretreater is at least 100 p.s.i. and that the pressure differential between the pretreater and the hydrotreater is at least 40 p.s.i.

Furthermore, it is to be noted that the reformers are operated under conditions of temperature, pressure and space velocity to produce a stabilized reformate of the required octane rating and in addition to produce excess hydrogen-containing gas in amount to supply at least about 200 to about 400, and preferably about 300 to about 390, standard cubic feet of hydrogen per barrel of feed to the hydrotreater.

It is also to be noted that the hydrotreater is operated at a pressure lower than that usually employed to produce a kerosene having a satisfactory mercaptan sulfur. In accordance with the present invention the lower hydrotreater pressures are employed and as a consequence less hydrogen needs to be circulated and yet a hydrotreated kerosene is produced which meets specifications. That is to say, that while in the prior art hydrotreating of kerosene 99 percent or more of the sulfur originally present in the kerosene is removed whereas in the hydrotreating of kerosene in accordance with the present invention up to 98 percent of the total sulfur can be removed.

I claim:

1. A process for upgrading a plurality of hydrocarbon mixtures of substantially different composition which comprises admixing deaerated hydrocarbon mixture boiling above the 90 percent point of light naphtha and below the 10 percent point of heavy gas oil and containing not more than 20 p.p.m. of oxygen with hydrogen-containing pretreater gas in the proportion of about 200 to about 400 s.c.f. of hydrogen per barrel of the aforesaid hydrocarbon mixture at a hydrotreating pressure of about 350 to 430 p.s.i.g. to form hydrotreater feed mixture, contacting said hydrotreater feed mixture with hydrogenating catalyst having hydrodesulfurizing capabilities in a hydrotreater at a temperature in the range of about 675° to about 750° F. and at a liquid hourly space velocity of about 4 to 6 to obtain hydrotreater effluent, separating said hydrotreater effluent into (1) a gaseous fraction comprising $C_3$ and lighter hydrocarbons, hydrogen, and hydrogen sulfide, (2) hydrotreater naphtha comprising $C_5$ to $C_{12}$ hydrocarbons, and (3) heavy fraction comprising hydrocarbons boiling above about 410° F., caustic-treating and water-washing said heavy fraction to obtain a heavy fraction containing not more than about 3 percent of the mercaptans present in said deaerated hydrocarbon mixture, about 0.0001 to about 0.0003 percent by weight of mercaptan-sulfur, and about 0.001 to about 0.002 percent by weight of total sulfur, mixing the aforesaid hydrotreater naphtha (2) with straight run naphtha to provide pretreater charge naphtha containing not more than 10 p.p.m. of nitrogen, heating said pretreater charge naphtha to hydrodesulfurizing temperature, mixing said heated pretreater charge naphtha at a pretreater pressure at least 40 p.s.i. greater than said hydrotreating pressure in the range of about 460 to about 490 p.s.i.g. with hydrogen-containing reformer gas in the proportion of about 150 to about 300 s.c.f. of hydrogen per barrel of pretreater charge naphtha to obtain a pretreater charge mixture, contacting said pretreater charge mixture with hydrogenating catalyst having hydrodesulfurizing and hydrodenitrogenizing capabilities at a temperature of about 675° to about 725° F. and at a liquid hourly space velocity of about 4 to 6 in a pretreater to obtain a pretreater effluent comprising hydrogen, hydrogen sulfide, ammonia, and $C_1$ and heavier hydrocarbons, at a first separation pressure of pretreater pressure less line drop in pressure, separating said pretreater effluent into pretreater gas comprising hydrogen, and light hydrocarbons, and first pretreater condensate, without recompression flowing said pretreater gas to said hydrotreater as the sole source of hydrogen in said hydrotreater feed mixture, at a second separation pressure at least 250 p.s.i. lower than the aforesaid first separation pressure separating second pretreater condensate comprising $C_4$ and heavier hydrocarbons from said first pretreater condensate, debutanizing said second pretreater condensate to obtain reformer feed containing not more than 20 p.p.m. of sulfur and not more than 1 p.p.m. of nitrogen, mixing said reformer feed with hydrogen-containing reformer gas to obtain reformer charge mixture comprising about 5 to about 12 mols of hydrogen per mol of reformer feed, contacting said reformer charge mixture with platinum-group metal reforming catalyst at reforming conditions of temperature in the range of about 800° to about 980° F., of pressure at least 100 p.s.i. greater than said pretreater pressure in the range of 450 to 600 p.s.i.g., and of liquid hourly space velocity of about 0.5 to about 2.5 to obtain reformer effluent, separating said reformer effluent at a reformer separation pressure of 450 to 600 p.s.i.g. less line drop in pressure into hydrogen-containing reformer gas and $C_5$ and heavier reformate, without recompression flowing a portion of said reformer gas to provide about 150 to 300 s.c.f. of hydrogen per barrel of pretreater charge naphtha to said pretreater as the sole source of hydrogen in said pretreater charge mixture, recompressing the balance of said reformer gas to a pressure in excess of said reformer pressure, and flowing said recompressed reformer gas to said reformer as the sole source of hydrogen in said reformer charge mixture.

2. The process as set forth in claim 1 wherein said first pretreater condensate is admixed with $C_3$ and $C_4$ hydrocarbons from a crude distillation.

3. The process at set forth in claim 1 wherein the butanes separated from the second pretreater condensate flow to a crude debutanizer.

References Cited in the file of this patent

UNITED STATES PATENTS

| | | |
|---|---|---|
| 2,671,754 | De Rosset et al. | Mar. 9, 1954 |
| 2,691,623 | Hartley | Oct. 12, 1954 |
| 2,763,358 | Linn et al. | Sept. 18, 1956 |
| 2,769,753 | Hutchings et al. | Nov. 6, 1956 |
| 2,773,008 | Hengstebeck | Dec. 4, 1956 |
| 2,833,698 | Patton et al. | May 6, 1958 |